(12) United States Patent
Burk (10) Patent No.: US 12,060,722 B2
(45) Date of Patent: Aug. 13, 2024

(54) WHEEL COUPLER AND SCRAPER FOR FLOOR STRIPPER

(71) Applicant: National Flooring Equipment, Inc., Minneapolis, MN (US)

(72) Inventor: Matthew C. Burk, Forest Lake, MN (US)

(73) Assignee: National Flooring Equipment, Inc., Minneapolis, MN (US)

( * ) Notice: Subject to any disclaimer, the term of this patent is extended or adjusted under 35 U.S.C. 154(b) by 330 days.

(21) Appl. No.: 17/748,673

(22) Filed: May 19, 2022

(65) Prior Publication Data

US 2023/0374801 A1    Nov. 23, 2023

(51) Int. Cl.
*E04G 23/00*    (2006.01)

(52) U.S. Cl.
CPC .................................. *E04G 23/006* (2013.01)

(58) Field of Classification Search
CPC .................................................... E04G 23/006
See application file for complete search history.

(56) References Cited

U.S. PATENT DOCUMENTS

| | | | | |
|---|---|---|---|---|
| 695,081 A * | 3/1902 | Reese | ................... | B60B 35/025 301/131 |
| 978,096 A * | 12/1910 | Wilson | ................... | B60B 35/025 301/132 |
| 2,890,910 A * | 6/1959 | Bern | ................... | B60B 3/14 301/35.63 |
| 4,004,838 A * | 1/1977 | Savage | ................... | B62D 11/04 411/965 |
| 4,162,809 A | 7/1979 | Anderson et al. | | |
| 4,626,033 A | 12/1986 | Anderson | | |
| 4,735,533 A * | 4/1988 | Gallagher | ............... | F16K 35/00 411/119 |
| 4,963,224 A | 10/1990 | Anderson | | |
| 5,100,247 A * | 3/1992 | Woehler | ................ | F16C 35/063 301/126 |
| 5,408,854 A * | 4/1995 | Chiu | ....................... | B60B 37/04 70/225 |
| 5,544,545 A * | 8/1996 | Sanders | .................... | B62D 1/10 74/552 |
| 5,716,107 A * | 2/1998 | Parker | ..................... | B60B 37/10 301/121 |
| 6,135,566 A | 10/2000 | Anderson | | |
| 6,467,853 B1 * | 10/2002 | Swartzendruber | ........ | F16D 1/08 411/538 |
| 6,578,931 B1 | 6/2003 | Anderson | | |

(Continued)

FOREIGN PATENT DOCUMENTS

| CN | 212066636 U | 12/2020 |
|---|---|---|
| CN | 213883084 U | 8/2021 |

(Continued)

OTHER PUBLICATIONS

WIPO, International Search Report Dated Sep. 4, 2023, 7 pages.

*Primary Examiner* — Jacob B Meyer
(74) *Attorney, Agent, or Firm* — Brad J. Thorson; DeWitt LLP (57) ABSTRACT

A drive wheel assembly for a floor stripping machine permits a drive wheel to be selectively locked to and unlocked from a drive axle and reduces the quantity of debris that is able to accumulate on the tire of a wheel during a floor stripping operation.

8 Claims, 5 Drawing Sheets

(56) References Cited

U.S. PATENT DOCUMENTS

| | | | |
|---|---|---|---|
| 6,609,762 B2 | 8/2003 | Anderson | |
| 6,666,526 B1 * | 12/2003 | Cummins | B60B 37/10 301/124.1 |
| 6,789,445 B1 * | 9/2004 | Todd | F16B 21/186 301/124.1 |
| 6,857,835 B2 * | 2/2005 | Wang | F16B 39/10 411/197 |
| 6,948,782 B2 * | 9/2005 | Porter | B60B 27/06 301/105.1 |
| 7,137,329 B1 * | 11/2006 | Moser | B23D 47/12 192/56.62 |
| 7,213,890 B2 * | 5/2007 | Porter | B60B 27/06 301/105.1 |
| 7,731,463 B2 * | 6/2010 | Davis | F16B 39/10 411/119 |
| 8,950,824 B2 * | 2/2015 | Eck | B60B 27/00 301/111.03 |
| 9,188,149 B2 * | 11/2015 | Bennett | F16B 41/005 |
| 9,618,050 B2 * | 4/2017 | Schnebele | B60K 17/16 |
| 10,968,647 B2 | 4/2021 | Anderson et al. | |
| 2004/0182654 A1 * | 9/2004 | Chen | B60B 27/0078 188/26 |
| 2004/0232760 A1 * | 11/2004 | Porter | B60B 27/06 301/105.1 |
| 2004/0262984 A1 * | 12/2004 | Morris | B60B 37/10 301/111.01 |
| 2023/0374801 A1 * | 11/2023 | Burk | E04G 23/006 |
| 2023/0374802 A1 * | 11/2023 | Burk | E04G 23/006 |

FOREIGN PATENT DOCUMENTS

| | | | |
|---|---|---|---|
| DE | 102011050666 A1 * | 11/2012 | E06B 9/42 |
| JP | 2007307991 A | 11/2007 | |

* cited by examiner

WHEEL COUPLER AND SCRAPER FOR FLOOR STRIPPER

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to machines for stripping materials, such as adhesively bonded floor coverings from floor surfaces, and more particularly to an improved machine of this type incorporating at least one driven axle, at least one wheel and a novel coupler adapted to selectively couple the wheel to the axle so that the wheel may be driven by the axle and decouple the wheel from the axle so that the wheel may rotate freely about the axle. A novel wheel scraper is also disclosed that is adapted to remove debris from the surface of the wheel irrespective of the direction of rotation of the wheel.

2. Discussion of the Prior Art

In 1979, Lloyd E Anderson was awarded U.S. Pat. No. 4,162,809 on a motorized carpet and tile stripping machine that comprised a box-like housing mounted on a pair of wheels disposed near the rear of the housing and a cutting blade projecting outwardly from the front of the housing and adapted to engage the ground beneath a floor covering that had been adhesively bonded to the floor. Supported on an upper deck of the housing was an electric motor whose output shaft was coupled to the machine's cutting head by means of an eccentric drive shaft such that the cutting head was made to move in an orbital or elliptical pattern. An elongated handle was also affixed to the upper deck of the housing and sloped rearward and upward terminating in handle grips.

When this machine was used to strip a floor covering, such as adhesively bonded carpeting from a concrete floor, the operator would first use a knife to cut the carpeting into strips. Next, the stripping machine would be placed at one end of the cut strip with its cutting head disposed in the interface between the carpeting and floor. The operator would then activate the motor to cause the cutting blade to orbitally rotate while he manually urged the machine forward by pushing against the handle.

While the machine made in accordance with U.S. Pat. No. 4,162,809 was somewhat effective in its operation, it required a high degree of manual effort and vibrated excessively making it somewhat difficult to control.

In 1986, Lloyd Anderson's son, Martin, was awarded U.S. Pat. No. 4,626,033. In this patent, Martin described an improvement made to his father's design to make the machine easier for an operator to control. Specifically, Martin added a motion retainer bar assembly between the machine's frame and the cutting head's drive bar to modify the degree of eccentricity between the drive bar and the shaft of the electric drive motor. While this improvement did make the machine somewhat easier to control, vibration remains somewhat excessive and the cutting blade actuation, while separating the carpeting from the floor, left considerable adhesive residue on the floor.

In U.S. Pat. No. 4,963,224, Martin Anderson described yet another improvement that he made to the floor stripping machine to reduce vibration. He designed in a pair of OILITE® sleeve bearings and affixed a pair of guide rods to the cutting head and which fit into the sleeve bearings to thereby constrain motion of the cutting head to reciprocating, back-and-forth movement parallel to the path of travel of the machine. While this improvement did, in fact, reduce machine vibration and prolong its useful life, minimizing its mean time to repair, no improvement was seen in the ability of the machine to remove adhesive residue from the floor following the stripping of the carpet therefrom.

In 2000, Martin Anderson was awarded U.S. Pat. No. 6,135,566 based on still other improvements to walk-behind floor stripping machines of the type described above. In this patent, he disclosed a machine that significantly increased the downward force of the machine's cutting blade against the floor by drastically increasing the overall weight of the machine. The scraping action of the cutting blade, when being pressed down on the floor by the weight of the machine, markedly improved its ability to remove adhesive residues. Increasing the weight of the machine, however, made it that much more difficult for an operator to push. Thus, he also disclosed a drive system for the machine in which the same motor used to drive the cutting blade also drives the machine's wheels, making it self-propelled and reducing the work effort required by the human operator.

The drive system drove an axle journaled in bearings. Wheels were keyed to the axle by key members such that they rotated with the axle. There was, however, no convenient way to disengage the key members to permit the wheels to freely rotate about the axle when the axle was not being rotated by the drive. This increased the steps required to load the machine into another vehicle for transport between job sites. It also made it difficult to move the machine within a job site between different areas where a floor scrapping operation was to be performed.

U.S. Pat. No. 6,609,762 was granted to Martin Anderson on Aug. 26, 2003. This patent describes a hydraulically powered self-propelled stripping machine having an electric motor driving a pump for pumping hydraulic fluid to hydraulic motors that turned axles coupled to the wheels. The hydraulic circuit included valves that could be actuated to control the speed and direction of the machine. There was, again, no mechanism for disengaging the wheels from the drive to permit the wheels to freely rotate about the axle.

U.S. Pat. No. 6,578,931, granted to Martin Anderson on Jun. 17, 2003, shows a mechanism for disengaging a drive wheel from a drive axle to allow the drive wheel to spin freely about the drive axle. However, that design mechanism included cross holes that needed to be aligned so that a pin could be inserted through the cross holes to re-engage the drive wheel with the drive axle. Aligning the cross holes proved to be difficult and often required lifting the machine to turn the wheel to achieve such alignment so the pin would be inserted. Also, the mechanism had loose parts that would become lost.

Another problem with the prior art machines described above is that material scrapped from a floor and stick to the wheels of the machine. If this material collects on the wheels and resides between the wheels and the floor, the machine will not ride smoothly over the floor and traction can be reduced.

Accordingly, the present invention provides a novel coupler adapted to selectively couple the wheels to the axle so that the wheels may be driven by the axle and decouple the wheel from the axle so that the wheel may rotate freely about the axle. The present invention also provides a novel wheel scraper adapted to remove debris from the surface of the wheel irrespective of the direction of rotation of the wheel.

SUMMARY OF THE INVENTION

The present invention relates to self-propelled machines for stripping adhesive-backed floor coverings from floor surfaces. The machine includes drive wheels comprising an outer surface, a round center opening of a first inner diameter, and a plurality of locking bores positioned about the round center opening. The machine also includes an axle extending about a longitudinal axis, adapted to be driven by a motor, and comprising a first, round section of a first outer diameter smaller than the first inner diameter and adapted to reside within the round center opening of the wheel and permit the wheel to rotate about the first, round section and longitudinal axis of the axle, a second, round section terminating in an end, a polygonal engagement section comprising a plurality of first longitudinal engagement surfaces and a polygonal radial engagement surface, and a threaded bore extending into the axle from the end. To permit effective, quick, and convenient coupling of the wheel to the axle so that the wheel may be driven by the axle and decouple the wheel from the axle so that the wheel may rotate freely about the axle, a novel lock is also provided.

The lock comprises a locking flange having a first side and a second side, a center opening surrounded and defined by a plurality of second engagement surfaces, collar extending from the first side and surrounding the center opening, and a plurality of locking pins extending from the second side. The lock further comprises a washer, a coil spring adapted to reside within the collar around the second, round section of the axle between the washer and the first side of the flange, and a threaded screw adapted to mate with the threaded bore of the axle to couple the washer to the end of the axle.

The locking flange is adapted to be moved between a locked position, an unlocked position, and an intermediate staging position. In the locked position, the spring holds the flange so that the flange surrounds the engagement section of the axle, the first longitudinal engagement surfaces of the axle are in face-to-face registration with the second engagement surfaces of the flange, and each of the plurality of locking pins of the flange resides in locking bores of the wheel. In the unlocked position, the first engagement surfaces are out of face-to-face registration with the second engagement surfaces, the second side of the flange is in engagement with the polygonal radial engagement surface of the axle, and the locking pins out of the locking bores. In the intermediate staging position, the spring and locking pins cooperate with the outer surface of the wheel to hold the flange away from the engagement section of the axle with the first engagement surfaces are out of face-to-face registration with the second engagement surfaces. More specifically, the locking pins are held out of the locking bores with their free ends bearing against the outer surface of the wheel.

The locking flange is easily moved from the locked position to the unlocked position. The locking flange is so moved by gripping the collar, pulling with sufficient force to overcome the force of the spring, and moving the flange so that locking pins are retracted from the locking bores and the center opening of the flange surrounds the second, round section of the axle rather than the engagement section of the axle. The flange is then rotated until the locking pins of the flange are no longer in alignment with the locking bores of the wheel. The collar is then released, and the spring holds the flange so that the second side of the flange resides against polygonal radial engagement surface of the axle with the locking pins out of engagement with the wheel, i.e., outside of the locking bores and not in engagement with the outer surface of the wheel, and the center opening of the flange surrounds the second, round section of the axle rather than the engagement section of the axle. This permits free rotation of the wheel about the axle. The flange is moved from the unlocked position to the intermediate staging position by rotating the flange to disengage its second surface of the flange from the polygonal radial engagement surface of the axle. When the flange is so rotated and then released, the spring will force the ends of the pins into contact with the outer surface of the wheel. Further rotation of the flange relative to the wheel (or the wheel relative to the flange) will bring the pins into alignment with the bores permitting the spring to force the pins into the bores thus returning the flange to the locked position. One skilled in the art will recognize that it is possible to return the flange directly to the locked position without first placing the flange in the intermediate staging position. This is achieved by carefully aligning the pins with the bores before releasing the flange. When the pins and bores are so aligned, releasing the collar allows the spring to force the flange away from the washer so that the locking pins reside in the locking bore and the engagement section of the axle resides within the center opening of the flange with the first engagement surfaces of the axle in face-to-face registration and engagement with the engagement surfaces of the flange.

When the locking flange is in the locked position, rotational forces applied by the drive to the axle are transmitted to the wheels. The drive can be operated to drive the wheels through the axle in either a clockwise or counterclockwise direction. A novel wheel scraper may be provided to remove debris from wheel as it rotates in either direction the clockwise or counterclockwise direction. The wheel scraper includes a stem, a shoulder, and a pair of diverging blades, e.g., an upper blade and a lower blade, extending from opposite ends of the shoulder. The stem includes at least one elongate slot adapted to receive a pair of mounting bolts. The mounting bolts extend from the machine through the elongate slot(s) and nuts are used to couple the wheel scraper to the machine. The slot(s) and bolts are arranged so the stem extends along an axis perpendicular to the longitudinal axis of the axle. As the wheel turns in the counterclockwise direction, the machine moves forward, and the wheel is scraped clean by the lower blade. As the wheel turns in a clockwise direction, the machine moves backward, and the upper blade scrapes the wheel clean. The slots permit adjustment of the position of the blades relative to the outer surface of the wheel.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts.

DETAILED DESCRIPTION

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

Figure 1:
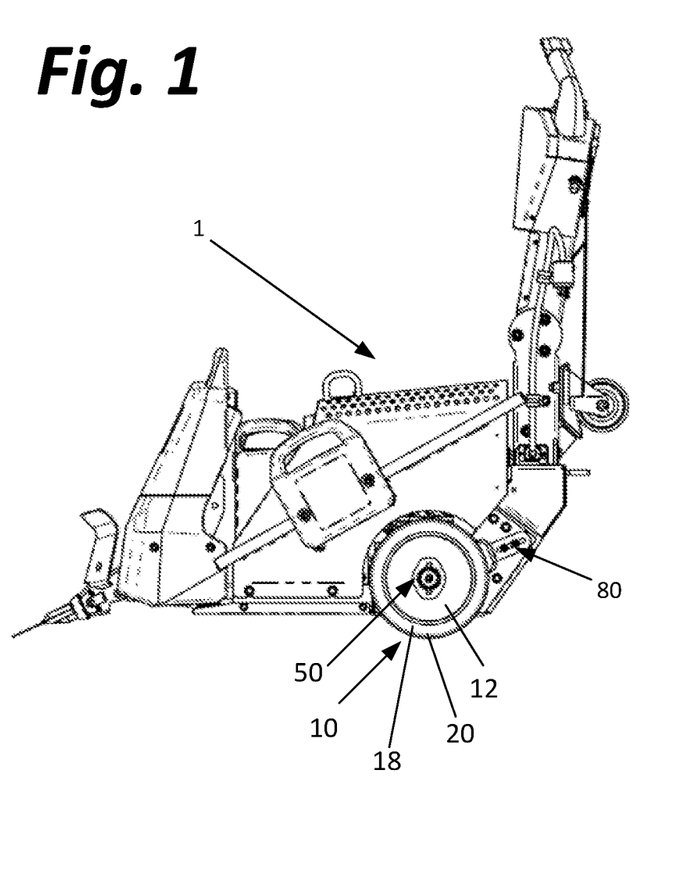
FIG. 1 side view of a floor stripping machine.

A self-propelled machine 1 for stripping adhesive-backed floor coverings from floor surfaces is partially shown in FIG. 1. The machine includes a plurality of drive wheels 10. Each drive wheel is adapted to be coupled to and decoupled from a drive axle by a lock 50. Further, the tread surface 20 of the tire 18 surrounding each wheel 10 is cleaned by a wheel scraper 80 as the machine 1 travels in either the forward or reverse direction.

Figures 2, 3:
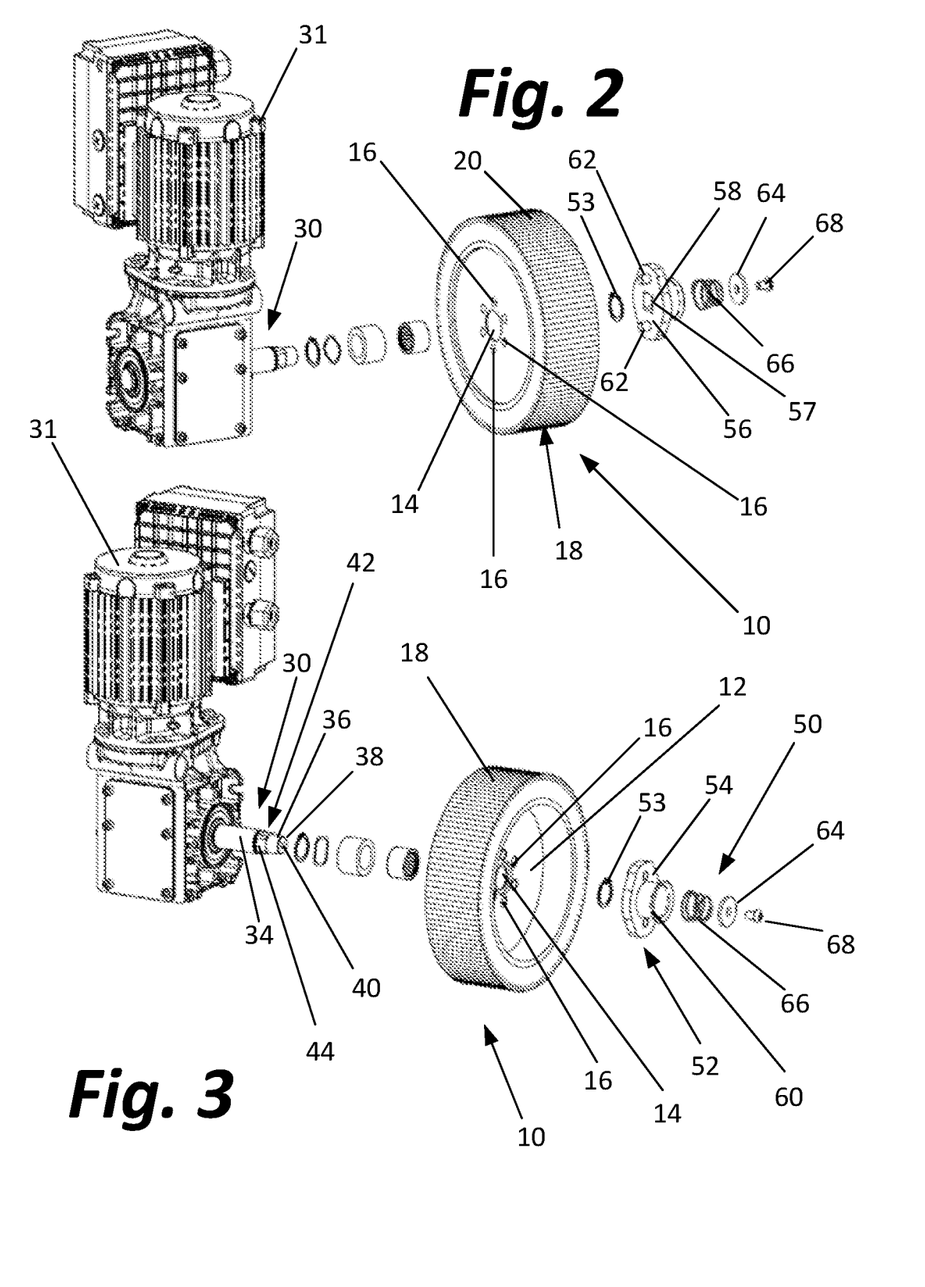
FIG. 2 is an exploded perspective view of an exemplary axle, wheel, and lock assembly for the floor stripping machine of FIG. 1 made in accordance with the present invention.
FIG. 3 is a second perspective view of the axle, wheel, and lock assembly of FIG. 1.
Figure 6:
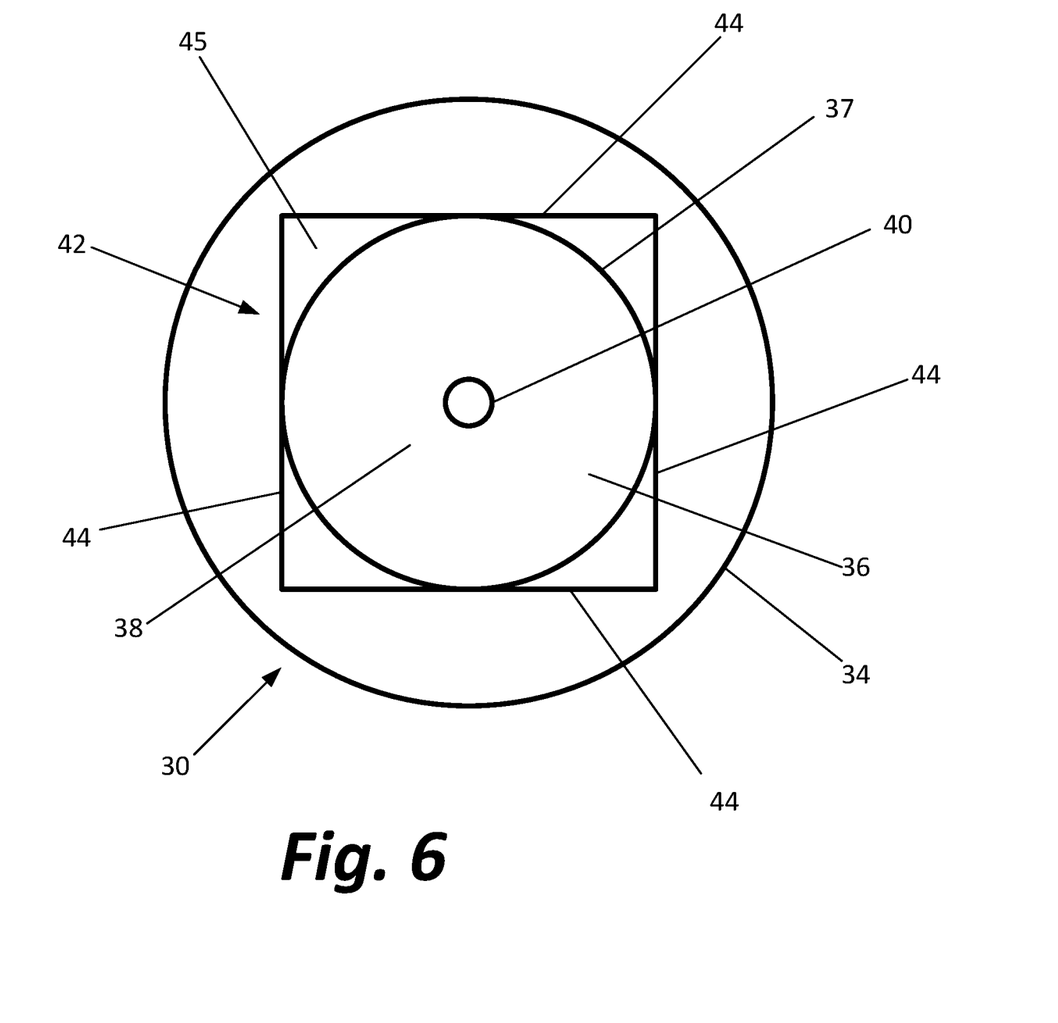
FIG. 6 is an end view of the axle of FIG. 2.
Figure 7:
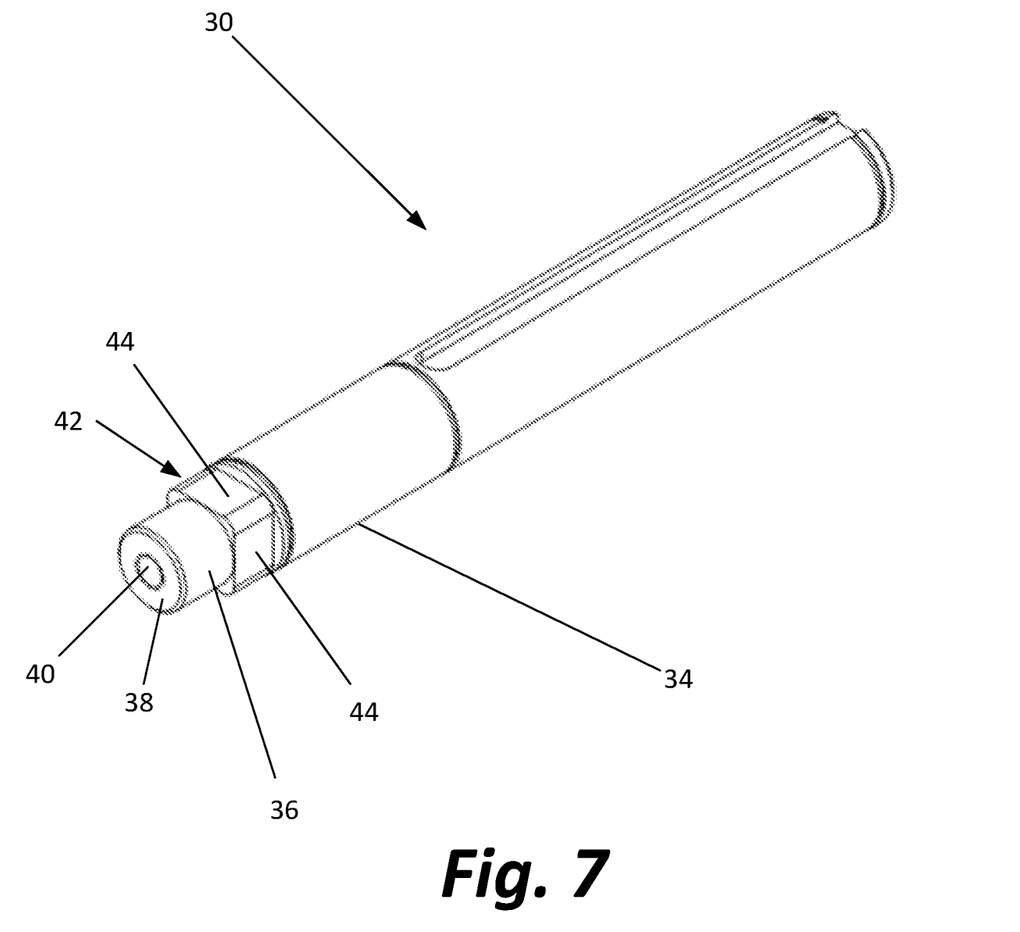
FIG. 7 is a perspective view of the axle of FIG. 2.

As shown in FIGS. 2, 3, and 6 each drive wheel 10 includes an outer surface 12, a round center opening 14 of a first inner diameter, and a plurality of locking bores 16 positioned about the round center opening 14. A tire 18 having a tread surface 20 is mounted to the wheel 10.

The drive wheels 10 are each mounted to an axle 30 driven by a motor 31. The axle 30 has first, round section 34 of a first outer diameter smaller than the first inner diameter of the round center opening 14 of the wheel 10. This first, round section 34 is adapted to reside within the round center opening 14 of wheel 10 and permit the wheel 10 to rotate about the first, round section 34 and longitudinal axis of the axle 30. The axle 30 has a second, round section 36 terminating in an end 38. A threaded bore 40 extends into the axle 30 from the end 38. Each axle 30 also has a polygonal engagement section 42 comprising a plurality of longitudinal engagement surfaces 44 (four of which are present in the embodiment shown) residing between the first, round section 34 and the second, round section 36. The polygonal engagement section also has an engagement surface 45 from which the second, round section 36 extends. The second, round section 36 has a circumferential engagement surface 37. Having the circumferential engagement surface 37 tangentially meet the longitudinal engagement surfaces 44 as shown in FIG. 6 offers advantages with respect to alignment.

A lock 50 is provided to selectively couple the wheel 10 to the axle 30 so that the wheel 10 rotates with the axle 30 and decouple the wheel 10 from the axle 30 so that the wheel 10 can freely rotate about the axle 30. A snap ring 53 is provided to prevent the wheel from moving axially. The lock 50 includes a locking flange 52. The locking flange 52 has a first side 54 and a second side 56, and a center opening 57 defined by a plurality of second engagement surfaces 58. As shown, the center opening 57 is both rectangular and square matching the shape of the engagement section 42 of the axle. A different shape for both the engagement section 42 and the center opening 57 may be employed without deviating from the invention. The number of second engagement surfaces 58 will typically match the number of first engagement surfaces 44.

A collar 60 extends from the first side 54 of the locking flange 52. The collar 60 surrounds the center opening 57. A plurality of locking pins 62 extend from the second side 56 of the locking flange 52. These pins 62 are adapted to be simultaneously aligned and mate with the locking bores 16 of the wheel 10. The lock 50 also includes a stop washer 64, a coil spring 66 adapted to reside within the collar 60 around the second, round section 36 of the axle 30 between the stop washer 64 and a portion of the first side 54 of the flange 52 within the collar 60. The lock further includes a threaded screw 68 adapted to mate with the threaded bore 40 to couple the stop washer 64 to the end 38 of the axle 30.

The lock 50, and more specifically the flange 52, is adapted to be moved between a locked position, and intermediate staging position, and an unlocked position. When the flange 52 is in the locked position, the spring 66 holds the flange 52 so that the flange 52 surrounds the polygonal engagement section 42 of the axle 30, the first longitudinal engagement surfaces 44 of the axle 30 are in face-to-face registration with the second engagement surfaces 58 of the flange 52, and the plurality of locking pins 62 reside in the locking bores 16 of the wheel 10. When the lock is in the unlocked condition, the spring 66 and a portion of the second side 56 of the flange 52 cooperate with the radial polygonal engagement surface 45 to hold the locking pins 62 both out of the locking bores 16 and away from the outer surface 12 of the wheel 10, and the first longitudinal engagement surfaces 44 of the axle 30 out of face-to-face registration with the second engagement surfaces 58 of the flange 52.

In the intermediate staging position, the second side 56 of the flange 52 is out of contact with the radial polygonal engagement surface 45 of the axle and the spring 66 cooperates with the washer and the flange to hold the free ends of the pins 62 against the outer surface 12 of the wheel 10.

Moving the locking flange 52 from the locked position to the unlocked position is achieved by gripping the collar 60 and pulling with enough force to overcome the force of spring 66 and retract the locking pins 62 from the locking bores 16. While still gripping the collar 60, the flange 52 is rotated relative to the axle so that when the collar is released 60 the spring forces the second side 56 of the flange 52 into contact with the radial polygonal engagement surface 45 of the axle's polygonal engagement section 42 thus holding the locking pins 62 both out of the locking bores 16 and away from the outer surface 12 of the wheel 10, and the first longitudinal engagement surfaces 44 of the axle 30 out of face-to-face registration with the second engagement surfaces 58 of the flange 52. When the lock 50 is in the unlocked configuration, the wheel 10 freely rotates about the axle 30 even when the axle 30 is not rotating.

One can move the locking flange 52 from the locked position to an intermediate staging position by gripping the collar 60 and pulling with enough force to overcome the force of spring 66 and then twisting the locking flange 52 so that the radial polygonal engagement surface 45 of the axle can pass through the center opening 57 of the flange 52 and the locking pins 62 are out of alignment with the locking bores 16 of the wheel. Releasing the collar 60 will cause the free ends of locking pins 62 to firmly engage the outer surface 12 of the wheel 10.

Moving the locking flange 52 from the intermediate staging position to the locked position is easily achieved by rotating the wheel 10 and the locking flange 52 relative to each other bringing the locking pins 62 into alignment with the locking bores 16. As soon as such alignment is achieved, the spring and the washer cooperate to push the flange 52 toward the outer surface 12 of the wheel 10 such that the locking pins 62 reside within the locking bores 16 and the longitudinal engagement surfaces 44 of the polygonal engagement section of the axle 30 engage the second engagement surfaces 58 of the flange 52.

Moving the locking flange 52 from the unlocked position to the intermediate position, and then to the locked position as described above is the most efficient approach to locking when performed in separate steps and is the preferred approach. Moving directly from the unlocked position to the locked position will not be the most efficient approach to locking as it requires simultaneous alignment of the wheel bore with lock pins, and polygonal shapes on the axle and lock. However, moving the locking flange 52 directly from the unlocked position to the locked position can be achieved in two different ways. One way is by gripping and twisting the collar 60, while holding the wheel 10 steady, until the locking pins 62 are aligned with the locking bores 16 and the center opening 57 of flange 52 is aligned with the polygonal engagement section 42 of the axle so that the radial polygonal engagement surface 45 of the polygonal engagement section 42 can pass through the center opening 57 of the flange 52. Another way is to grip and pull on the collar 60, while rotating the wheel 10 until the locking pins 62 are aligned with the locking bores 16 and the center opening 57 of flange 52 is aligned with the polygonal engagement section 42 of the axle so that the radial polygonal engagement surface 45 of the polygonal engagement section 42 can pass through the center opening 57 of the flange 52. In either case, releasing the collar 60 with the locking pins 62 and locking bores 16, and the center opening 57 and the polygonal engagement section 42, so aligned will result in the spring 66 pushing the flange 52 so that the locking pins 62 reside within the locking bores 16 and the first longitudinal engagement surfaces 44 of the axle 30 are in face-to-face registration and engagement with the second engagement surfaces 58 of the flange 52. In this configuration, the wheel 10 is unable to rotate independent of the axle 30 and will rotate in the same direction (either clockwise or counterclockwise) as the axle 30.

More specifically, when the locking flange 52 is in the locked position, rotational forces applied by the drive to the axle 30 are transmitted to the wheels 10 and the tires 18 mounted thereon. The drive motor 31 thus can be operated to drive the wheels 10 through the axle 30 in either a clockwise or counterclockwise direction.

Much debris is generated on the surface of the floor being stripped during any stripping operation. Typically, such debris includes adhesive materials stripped from the floor. Such debris often accumulates on the tires 18 hindering efficient and effective operation of the machine 1.

Figure 4:
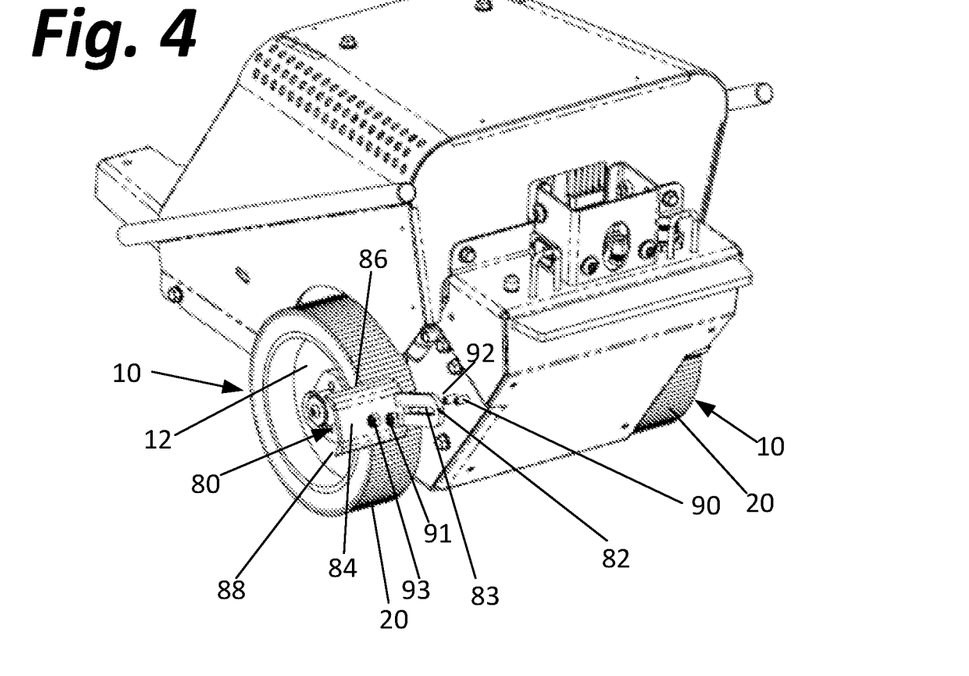
FIG. 4 is a perspective view of a tread surface scraping assembly of the floor stripping machine of FIG. 1.
Figure 5:
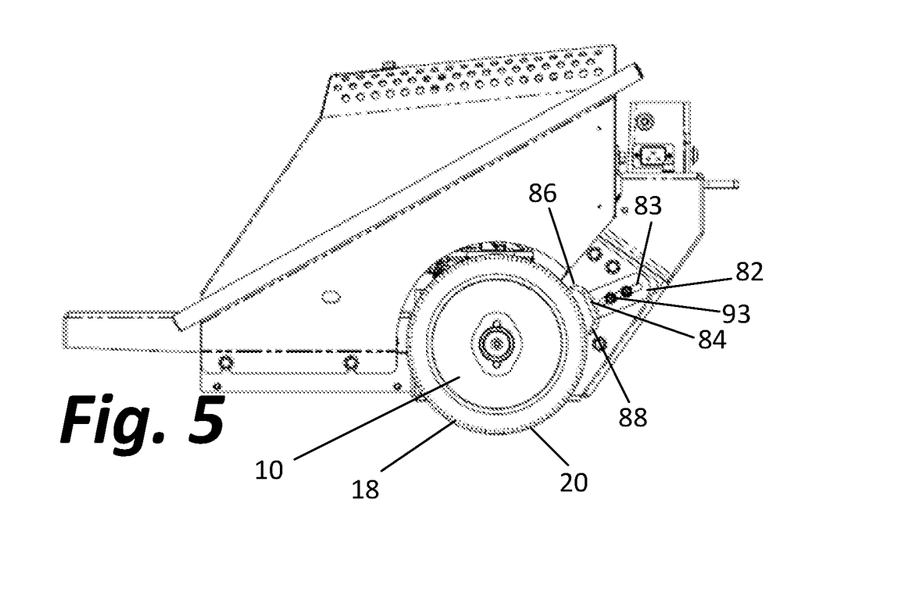
FIG. 5 is a side view of a tread surface scraping assembly of the floor stripping machine of FIG. 1.

To address this problem, a wheel scraper 80 may be provided to remove debris from tread surface 20 of the tire 18 as the tire 18 and wheel 10 rotate in either the clockwise or counterclockwise direction. The wheel scraper 80 includes a stem 82, a shoulder 84, and a pair of diverging blades 86 and 88, e.g., an upper blade and a lower blade, extending from opposite ends of the shoulder 84. The stem 82 includes at least one elongate slot 83 adapted to receive a pair of mounting bolts 90 and 92. The mounting bolts 90/92 extend through the elongate slot(s) 83 and are used to couple the wheel scraper 80 to the machine using a pair of nuts 91/93, with the stem 82 extending along an axis perpendicular to the longitudinal axis of the axle. As the wheel 10 turns in the counterclockwise direction, the machine moves forward, and the tread surface 20 of the tire 18 is scraped clean by the lower blade 88. As the wheel 10 turns in a clockwise direction, the machine moves backward, and the upper blade 86 scrapes the tread surface 20 of tire 18 clean. The slot(s) 83 permit adjustment of the position of the blades 86 and 88 relative to the tread surface 20.

Within the scope of the following claims, the invention may be practiced otherwise than as specifically shown in the drawings and described above. The foregoing description is intended to explain the various features and advantages, but is not intended to be limiting. The scope of the invention is defined by the following claims which are also intended to cover a reasonable range of equivalents.

What is claimed is:

1. A wheel assembly for a floor stripping machine comprising:
   a. a wheel comprising an outer surface, a round center opening of a first inner diameter, and a plurality of locking bores positioned about the round center opening;
   b. an axle extending about a longitudinal axis, adapted to be driven by a motor, and comprising (i) a first, round section of a first outer diameter smaller than the first inner diameter and adapted to reside within the round center opening of the wheel and permit the wheel to rotate about the first, round section and longitudinal axis of the axle, (ii) a second, round section terminating in an end, (iii) an engagement section comprising a plurality of first longitudinal engagement surfaces and a radial polygonal engagement surface, and (iv) a threaded bore extending into the axle from the end;
   c. a lock comprising (i) a locking flange having a first side and a second side, a center opening defined by a plurality of second engagement surfaces, a collar extending from the first side and surrounding the center opening and a portion of the first side, and a plurality of locking pins extending from the second side, (ii) a washer, (iii) a coil spring adapted to reside within the collar around the second, round section between the washer and the first side of the flange, and a threaded screw adapted to mate with the threaded bore to couple the washed to the end of the axle;
   wherein the locking flange is adapted to be moved between a locked position and an unlocked position, wherein when the locking flange is in the locked position the spring holds the flange so that (i) the flange surrounds the engagement section of the axle, (ii) the first longitudinal engagement surfaces are in face-to-face registration with the second engagement surfaces, and (iii) the locking pins reside in the locking bores; and wherein when the locking flange is in the unlocked position, a portion of the second side of the flange engages the radial polygonal engagement surface of the engagement section of the axle holding the first longitudinal engagement surfaces out of face-to-face registration with the second engagement surfaces, and the locking pins out of the locking bores and away from the outer surface of the wheel.

2. The wheel assembly for a floor stripping machine of claim 1 wherein the second, round section has a circumferential surface that tangentially meets each of the plurality of first longitudinal engagement surfaces.

3. The wheel assembly for a floor stripping machine of claim 1 wherein the center opening of the locking flange is polygonal.

4. The wheel assembly for a floor stripping machine of claim 1 wherein the center opening of the locking flange is square.

5. The wheel assembly for a floor stripping machine of claim 1 wherein the locking pins have free ends and the locking flange is also adapted to be moved to an intermediate staging position in which the second side of the locking flange is out of contact with the radial polygonal engagement surface of the engagement section of the axle and the spring cooperates with the washer and the flange to hold the free ends of the locking pins against the outer surface of the wheel.

6. The wheel arrangement for a floor stripping machine of claim 1 further comprising a wheel scraper.

7. The wheel arrangement for a floor stripping machine of claim 1 wherein the wheel scraper comprises a stem, a shoulder, and a pair of diverging blades extending from opposite ends of the shoulder.

8. The wheel arrangement for a floor stripping machine of claim 7 wherein the stem includes at least one elongate slot adapted to receive at least one bolt for mounting the stem to the floor stripping machine.

\* \* \* \* \*